United States Patent
Cannings et al.

(10) Patent No.: US 10,810,313 B2
(45) Date of Patent: Oct. 20, 2020

(54) SYSTEM AND METHOD FOR PRESERVING PRIVACY OF DATA IN THE CLOUD

(71) Applicants: CHASE INFORMATION TECHNOLOGY SERVICES LIMITED, London, Greater London (GB); Nigel Henry Cannings, London (GB)

(72) Inventors: Nigel Henry Cannings, London (GB); Gerard Chollet, London (GB); Cornelius Glackin, London (GB); Muttukrishnan Rajarajan, London (GB)

( * ) Notice: Subject to any disclaimer, the term of this patent is extended or adjusted under 35 U.S.C. 154(b) by 134 days.

(21) Appl. No.: 15/765,264

(22) PCT Filed: Oct. 3, 2016

(86) PCT No.: PCT/GB2016/053072
§ 371 (c)(1),
(2) Date: Mar. 31, 2018

(87) PCT Pub. No.: WO2017/055879
PCT Pub. Date: Apr. 6, 2017

(65) Prior Publication Data
US 2018/0285576 A1  Oct. 4, 2018

(30) Foreign Application Priority Data

Oct. 1, 2015 (GB) .................................. 1517331.3

(51) Int. Cl.
*G06F 21/60* (2013.01)
*G06N 3/02* (2006.01)
(Continued)

(52) U.S. Cl.
CPC ............. *G06F 21/602* (2013.01); *G06N 3/02* (2013.01); *G10L 19/0018* (2013.01); *H04L 9/0631* (2013.01)

(58) Field of Classification Search
CPC ............................. G10L 19/0018; G06N 3/02
See application file for complete search history.

(56) References Cited

U.S. PATENT DOCUMENTS

| | | | |
|---|---|---|---|
| 6,119,086 A * | 9/2000 | Ittycheriah | G10L 19/0018 704/267 |
| 10,007,803 B2 * | 6/2018 | Kaushik | H04L 67/1097 |

(Continued)

OTHER PUBLICATIONS

Raghavendra, S., et al. "MSSS: most significant single-keyword search over encrypted cloud data." Proceedings of the 6th annual intrernational conference on ICT: BigData, Cloud and Securit. 2015. (Year: 2015).*

(Continued)

*Primary Examiner* — Madhuri R Herzog

(57) ABSTRACT

A system and method for preserving the privacy of data while processing of the data in a cloud. The system comprises a computer program application and a client encryption key, The system is operable to encrypt the computer program application and data using the client encryption key; upload the encrypted computer program application and encrypted data in the cloud; enable the computer platform to undertake processing of the encrypted data in the cloud using the encrypted computer program application; output encrypted processing results; and, enable decryption of the encrypted processing results using the client encryption key.

18 Claims, 5 Drawing Sheets

(51) Int. Cl.
    *G10L 19/00*    (2013.01)
    *H04L 9/06*    (2006.01)

(56) References Cited

U.S. PATENT DOCUMENTS

| | | | | |
|---|---|---|---|---|
| 2004/0019479 A1* | 1/2004 | Hillis | ............... | G10K 11/175 704/200.1 |
| 2009/0043581 A1* | 2/2009 | Abbott | ............... | G10L 15/187 704/254 |
| 2010/0278453 A1* | 11/2010 | King | ............... | G06Q 10/10 382/321 |
| 2017/0178664 A1* | 6/2017 | Wingate | ............... | G10L 21/028 |

OTHER PUBLICATIONS

Trapdoor Function from Wikipedia, the free encyclopedia; Date: Oct. 12, 2014 (Year: 2014).*

Ibrahim, Ayad, et al. "Secure rank-ordered search of multi-keyword trapdoor over encrypted cloud data." 2012 IEEE Asia-Pacific Services Computing Conference. IEEE, 2012. (Year: 2012).*

Liu, Chang, Liehuang Zhu, and Longyijia Li. "Fuzzy keyword search on encrypted cloud storage data with small index." 2011 IEEE International Conference on Cloud Computing and Intelligence Systems. IEEE, 2011. (Year: 2011).*

Zhang, Wei, et al. "Secure ranked multi-keyword search for multiple data owners in cloud computing." 2014 44th Annual IEEE/IFIP International Conference on Dependable Systems and Networks. IEEE, 2014. (Year: 2014).*

\* cited by examiner k 99.71%
hh 0.13%
kcl 0.11%
ch 0.01%
p 0.01% iy iy iy iy ih ih paupauhh iy ix kcl k
iy iy iy dd jh jh pauhh iy iy ux kd

SYSTEM AND METHOD FOR PRESERVING PRIVACY OF DATA IN THE CLOUD

INTRODUCTION

The present invention relates to preserving the privacy of data in the cloud and particularly to preserving the privacy of data processing in the cloud and more particularly to preserving the privacy when processing speech data in the cloud.

Cloud services provide an inexpensive platform for the storage and computation of data. Furthermore, the cost of using cloud services is decreasing and therefore the use of cloud services and cloud service applications are expected to increase in the future.

In many activities involving big data, cloud computing offers a common distributed infrastructure for the storage of large amounts of data in a scalable, efficient, and low cost way.

Individuals and organisations use cloud services to both store and process data. However, an increasing number of individuals and organisations also outsource both storage and processing of data to cloud computing services. An individual or organisation which stores and/or performs computational processing of data on a cloud is generally known as a client.

The cloud is a public infrastructure and therefore data stored on it must be secured to prevent unauthorised access to sensitive data. Often, access must be secure not only from members of the public, such as eavesdroppers, but also from the cloud service provider.

This is generally achieved by encrypting the data.

For sensitive data there is the possibility to use encryption for the secure storage of data in the cloud.

In very general terms, there are three types of encryption schemes: secret key (or symmetric) cryptography; public key (or asymmetric) cryptography; and hash functions.

Secret Key Cryptography (SKC) uses a single key for both encryption and decryption. The sender uses the key to encrypt the data and sends the encrypted data to the receiver. The receiver applies the same key to decrypt the encrypted data and recover the data for processing.

Public Key Cryptography (PKC) uses one-way functions, or mathematical functions that are relatively easy to compute, with associated inverse function that are relatively difficult to compute. This provides security without the parties having to share a secret key, for data which is, for example, communicated over a non-secure communication channel or which is being processed. Generic PKC employs two keys that are mathematically related, although knowledge of one key does not allow someone to easily determine the other key. One key is used to encrypt the data and the other key is used to decrypt the encrypted text. Therefore, one key can be designated as a public key, and the other as a private key.

Hash functions are algorithms that do not use "keys" in the sense of SKC and PKC. Instead, a fixed length hash value is computed based on the data that makes it impossible for either the contents, or length of the data, to be recovered. Hash algorithms are generally used to provide a digital fingerprint of a file's contents, which can be used to ensure that a file has not been altered by an intruder or virus.

Modern encryption techniques, although not perfect, are nevertheless effective. Even relatively weak encryption may only be broken by very determined adversaries, and stronger encryption techniques are effectively substantially unbreakable.

Whilst the industry has become increasingly good at encrypting data at rest, in order to process the data on the cloud the data first needs to be decrypted. However, this excludes the possibility of using the cloud's resources to process sensitive data, unless it can be done in a secure way.

An example of sensitive data is speech data. Speech contains biometric and other information which should remain private and therefore inaccessible to the cloud provider. Therefore, cloud users want to hide sensitive data such as speech, from cloud providers. Similarly, companies using cloud services want to protect their intellectual property from cloud providers and users. Hence the need for strategies for processing data securely in the cloud becomes increasingly more important.

Speech is not reproducible in the sense that no speaker is capable of making the same utterance the same way twice. There are always small acoustic differences between utterances that have the same base transcription and this is a particular challenge of performing encrypted speech recognition.

Therefore, a privacy problem arises when processing and computing is performed on cloud-stored data, particularly if the cloud platform provider itself performs the processing and/or computation. For example, such a need may arise when the cloud platform itself has to run an Application on the client data, or a third-party authorised by the client has to perform operations on the data, such as, for example, retrieval, searching or mining. In order to perform mathematical operations on encrypted data, it must be decrypted and made available in the form of the original data. This clearly provides a break in the security. Furthermore, even if all parties engaged in the computation can be trusted, the platform on which the computation is being performed (i.e. the cloud computing platform) remains untrusted. This situation can be exacerbated when restrictions are placed on the access provided to the third parties who are party to the computation.

Also, in other industries, such as, for example, the healthcare sector, there exists the potential for the storage and processing of medical records in the cloud. However, currently the computer platforms need to have access to the stored data in an unencrypted or decrypted format in order to compute and process the data for clients.

Gentry, C. describes a method of fully homomorphic encryption (FHE) [Gentry, C.: '*Fully homomorphic encryption using ideal lattices*', Proc. 41*st ACM Symposium on Theory of Computing*, 2009]. In theory FHE offers the possibility of constructing encrypted algorithms that operate on encrypted data in such a way that neither the client's data nor the server's intellectual property is decrypted on the cloud. However, as described by Wang, W., Hu Y., and Chen L. et al, FHE utilizes modular multiplication and addition operations on primitives in the order of millions of bits [Wang, W., Hu, Y, Chen, L., et al.: '*Accelerating fully homomorphic encryption using GPGPUs*', *IEEE Conf. High Performance Extreme Computing*, 2012, pp. 1-5]. This makes it unfeasible to use for big data tasks, even when configured for GPGPU (General Purpose Graphics Processing Unit) acceleration. Partially homomorphic encryption (PHE) schemes such as Paillier encryption offer some speed up. However, these schemes are still computationally demanding [Paillier, P.: '*Public-key cryptosystems based on composite degree residuosity classes*', *Advances in Cryptology, EUROCRYPT*, 1999, pp. 223-238]. Additionally, PHE schemes are limited in the range of the mathematical operations they can implement, and hence they typically employ some form of secure multiparty computation by necessity to augment them. However, this then necessitates that large amounts of encrypted data are passed to the client periodically for decryption and processing outside of the cloud before re-encryption of the results and transfer back to the cloud; understandably for practical purposes the communication overhead then becomes a limiting factor.

Moreover, speech is not reproducible in the sense that no speaker is capable of making the same utterance the same way twice, there are always small acoustic differences between utterances that have the same base transcription and this is a particular challenge of performing encrypted speech recognition. Hence in order to utilize the cloud for processing large amounts of audio data in a secure way, the industry requires further innovation in cryptographic schemes to solve the above-mentioned problems.

Therefore, there exists a need in industry for means to ensure that cloud computing platform service providers do not gain any information about the data, while releasing the output of the computation to all trusted parties.

An objective of the present invention is therefore to provide a method and system which ensures cloud computing platform providers do not gain any information about data, while computing data and releasing the output of computations to trusted parties.

SUMMARY OF INVENTION

According to a first aspect of the present invention, there is provided a method for preserving privacy during encrypted search of speech data, the method comprising: receiving an audio recording; providing an audio encrypter; converting the received audio recording to provide a text or binary file format representation of the audio recording; encrypting the converted text or binary file format representation of the audio recording to provide an encrypted text or binary file format representation of the received audio recording; storing the encrypted text or binary file format representation on the cloud; providing a phonetic encoder; phonetically encoding the received audio recording to provide an encoded phonetic transcription representing the received audio recording; encrypting the phonetic transcription to provide an encrypted phonetic transcription representing the received audio recording; storing the encrypted phonetic transcription representation on the cloud; providing a searchable encrypter, identifying one or more phonemes from the encoded phonetic transcription; assigning an integer to each phoneme and generating a client-side index from the assigned integers; providing a relevance generator which generates a frequency table based on the occurrence of phonemes in each encoded phonetic transcription and generating a server-side secure index and uploading the server-side secure index to the cloud before destroying the server-side secure index on the client side; providing a search engine; receiving a keyword enquiry represented as a phonetic string; converting the phonetic string to a sequence of integers using the a client-side index generator; generating a trapdoor function for the phonetic string and uploading the trapdoor function to the cloud; searching the server-side index table, using the uploaded trapdoor function, for the most relevant phonetic transcription and corresponding audio file, returning the most relevant encrypted text or binary file format representation; decrypting the returned encrypted text or binary file format representation and phonetic transcription to an audio file for playing at the relevant time interval.

The keyword enquiry is advantageously received as one or more words and the, or each, word is converted into the phonetic string.

The relevance score is advantageously computed from the equation:

$$\text{Score}(Q, F_d) = \sum_{t \in Q} \frac{1}{|F_d|} (1 + \ln f_{d,x}) \ln\left(1 + \frac{N}{f_t}\right)$$

The encryption is preferably Advanced Encryption Standard, AES, encryption.

The step of phonetically encoding the received audio recording advantageously comprises converting the audio recording into a Short-Term Fourier Transform, STFT, and then finding the magnitude of the STFT complex array to generate a spectrogram.

The STFT spectrograms are advantageously passed to a trained Convolutional Neural Network, CNN, which classifies sliding windows operating over the spectrogram into phonetic symbols.

Each sliding window operating over the spectrogram is advantageously 256×256 greyscale pixels.

Generating the server-side index table advantageously comprises modifying the client-side index table by: replacing the words of the client-side index server with integers which are the multiplicative inverse of their corresponding client-side index computed modulo prime p; replacing the file names in the frequency table of the client-side server with encrypted file names; and replacing the recorded frequencies in the client-side server with relevance scores which are computed using the following formula:

$$\text{Score}(Q, F_d) = \sum_{t \in Q} \frac{1}{|F_d|} (1 + \ln f_{d,x}) \ln\left(1 + \frac{N}{f_t}\right)$$

According to a second aspect of the present invention there is provided a method of searching encrypted speech data, the method of searching comprising using the method of the first aspect of the present invention.

According to a third aspect of the present invention there is provided a computer-readable storage device having instructions stored which, when executed by a computing device, result in the computing device performing operations in accordance with a method according to the first aspect of the present invention.

According to a fourth aspect of the present invention there is provided a system for preserving privacy during encrypted search of speech data, the system comprising a computer program application operable to carry out the method of the first aspect of the present invention.

DESCRIPTION

The present invention will now be illustrated, by way of example, with reference to the accompanying drawing, in which.

Figure 1:
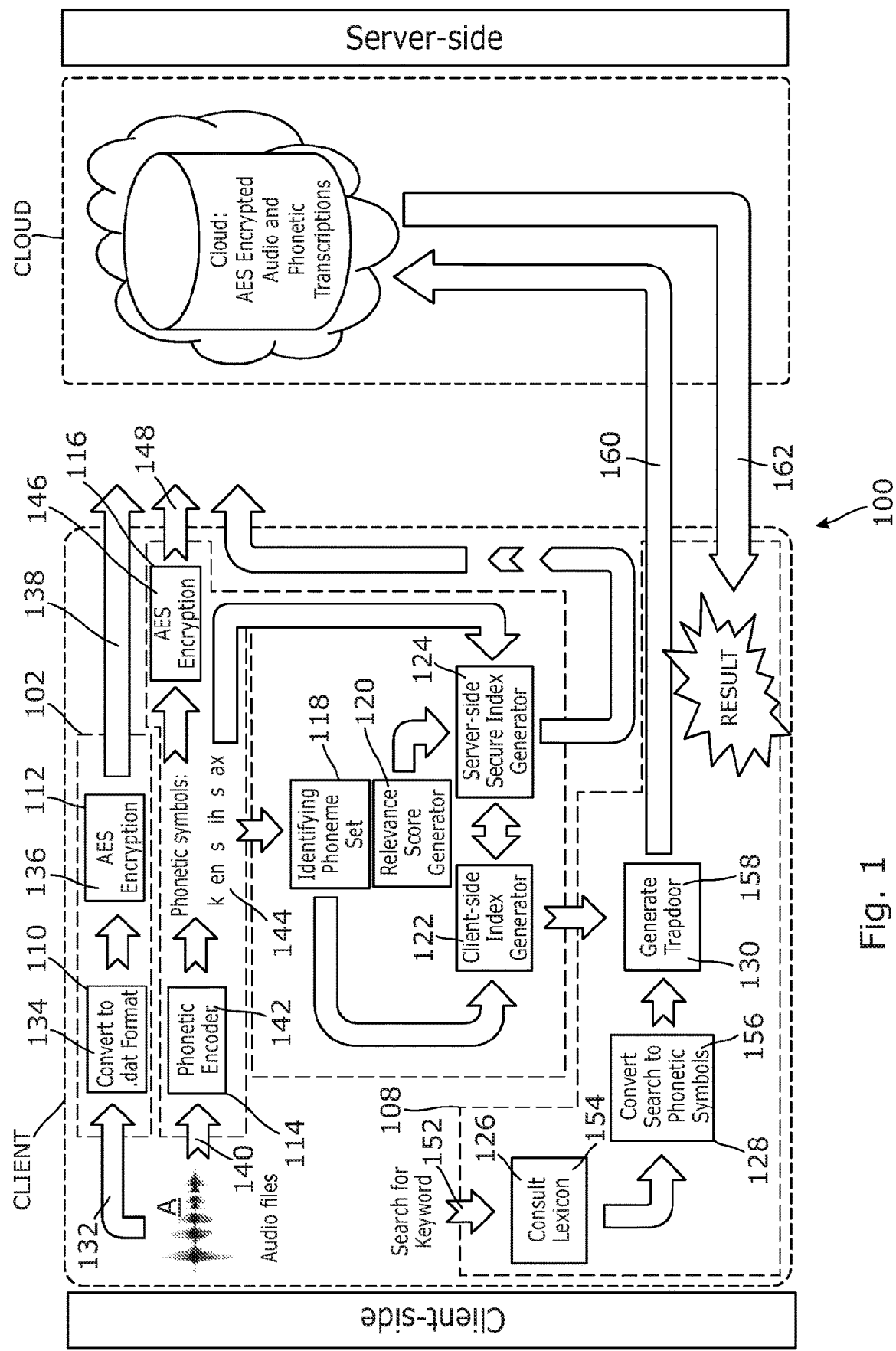
FIG. 1 is a schematic drawing of a method and system according to the present invention.
Figure 2:
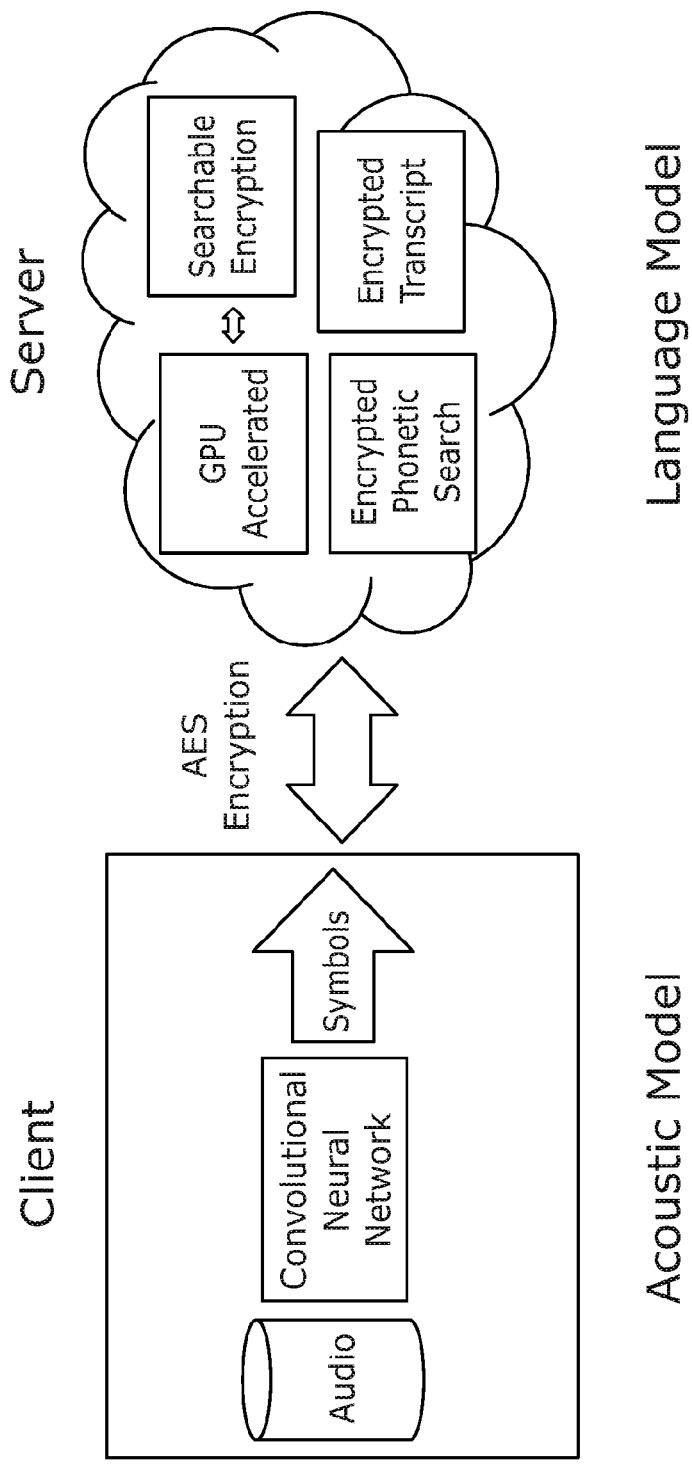
FIG. 2 is a schematic drawing showing the division of responsibilities between client-side and server-side in the method and system of FIG. 1.

Referring to FIGS. 1 and 2, a method and system (100) for preserving privacy during encrypted search of speech, according to the present invention, involves the compression of speech containing biometric identifiers to a symbolic representation that anonymizes the users' identity, and then the use of searchable symmetric encryption to enable the finding of strings of symbols (e.g. phones) in an encrypted speech transcription. Encrypted string matching is performed to realize the language modelling component of the speech recognition system. FIG. 2 illustrates the concept and the demarcation of responsibilities between a client-side (CLIENT) and cloud-side server (CLOUD).

Referring to FIG. 1, the method and system (100) comprises an audio processor (102), a phonetic processor (104), a searchable encrypter (106) and an encrypted phonetic search engine (108).

The audio processor (102) comprises an audio convertor (110) and a transcript encrypter (112).

The phonetic processor (104) comprises a phonetic encoder (114) and a phonetic encrypter (116).

The transcript encrypter (112) and the phonetic encrypter (116) are advantageously AES encryptors. However, other methods of encryption may be used.

The searchable encryptor (106) comprises a phoneme identifier (118), a relevance score generator (120), a client-side index generator (122) and a server-side index generator (124).

The encrypted phonetic search engine (108) comprises a lexicon (126), a phonetic convertor (128) and a trapdoor generator (130).

The audio processor (102) receives recorded speech in the form of an audio file (A) (132) and passes it to the audio convertor (110), which converts the speech into a text file (134), such as, for example a .dat format file. The text file contains the raw audio format of the recorded speech. The text file is then passed to the transcript encrypter (112) which encrypts the text file (134), preferably using AES encryption to provide an encrypted text file, which is then uploaded for storage on the cloud (138).

The phonetic processor (104) undertakes speech recognition of the recorded speech and receives the recorded speech as an audio file (140)

Speech recognition is typically broken down into acoustic and language modelling tasks. Acoustic models convert raw speech wave forms into acoustic units such as phones. Language models incorporate natural language processing and Bayesian probability theory to infer the text transcription, given what is known of a particular language, and what words the sequences of phones likely correspond to.

Regarding privacy preservation, in the cloud modality it is important to make sure that personal information is not shared on the cloud. Since speech is a biometric data type, it is possible to identify someone and accurately infer a whole host of information that extends beyond the obvious information such as gender, to data such as height, weight, age, health and so on. Accordingly, there is a need to ensure that speech itself is never in an unencrypted form on the cloud.

Traditionally, Automatic Speech Recognition (ASR) involves multiple successive layers of feature extraction to compress the amount of information processed from the raw audio so that the training of the acoustic model does not take an unreasonably long time. However, in recent years with increases in computational speed, adoption of parallel computation with GPGPUs, and advances in neural networks, the predominant direction researchers have taken has been to replace traditional ASR algorithms with data-driven approaches that simply take the audio data in its frequency form (e.g. spectrogram) and process it with a Deep Neural Network (DNN), or more appropriately (since speech is temporal) with a Recurrent Neural Network (RNN) that can be trained quickly with GPGPUs. The RNN then converts the spectrogram directly to phonetic symbols and in some cases directly to text. Such a method is described by Hannun, A., Case, C., Casper, J., et al. [Deep speech: Scaling up end-to-end speech recognition', arXiv preprint arXiv: 1412.5567, 2014].

The problem with these approaches from the encryption point of view is that they typically combine the acoustic model and the language model with one neural network. This involves aligning the acoustic data (containing sensitive biometrics) at various stages of the network training with the text transcription with Expectation Maximization, Viterbi Search or Connectionist Temporal Classification.

The present Application describes an alternative method and system which provides a higher level of privacy preservation by separating the acoustic and language model training between the client side (CLIENT) and server-sides (CLOUD) of the system (100).

Thus, the acoustic model is trained in isolation to the language model. In the acoustic model, according to the present invention, spectrograms are used as input and phonemes as output classes for training with a Convolutional Neural Network (CNN). Being able to train a system to identify time-frequency intervals in acoustic data and relate it to acoustic units such as phonemes requires extremely accurate labelling of acoustic data, and this is afforded by the TIMIT speech corpus.

An implementation of the GoogLeNet architecture with Stochastic Gradient Descent, GSD, is used for training the phonetic transcription within the TIMIT corpus. Once the CNN acoustic model is trained it is then uploaded to the client-side (CLIENT) and used as the phonetic encoder (114) to perform inferencing, encoding the recorded speech of the audio file (A) (142) into a phonetic transcription of phonetic symbols (144).

Figure 3:
FIG. 3 is a schematic drawing showing a speech encoder in accordance with the method and system of FIG. 1.
Figure 3:
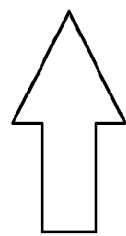

Referring also to FIG. 3, upon receiving the audio file (A) the phonetic encoder 114 encodes the audio file (A) by first converting it to Short-Term Fourier Transform, STFT, spectrograms which are then passed to the trained CNN which classifies the sliding windows operating over the spectrogram into phonetic symbols. FIG. 3 illustrates the operation of this convolutional speech encoder, where the sliding windows operating over the spectrogram (each one is 256× 256 greyscale pixels) are classified by the CNN into phoneme classes. These are then encrypted (146) by the phonetic encrypter (116) with AES encryption and uploaded to the cloud (148). Hence as well as storing encrypted audio the cloud also stores a symbolic representation of the encrypted speech data.

Although, the method and system, according to the present invention, use CNN other speech recognition acoustic models can be used, such as deep neural networks and recurrent neural networks.

Figure 4:
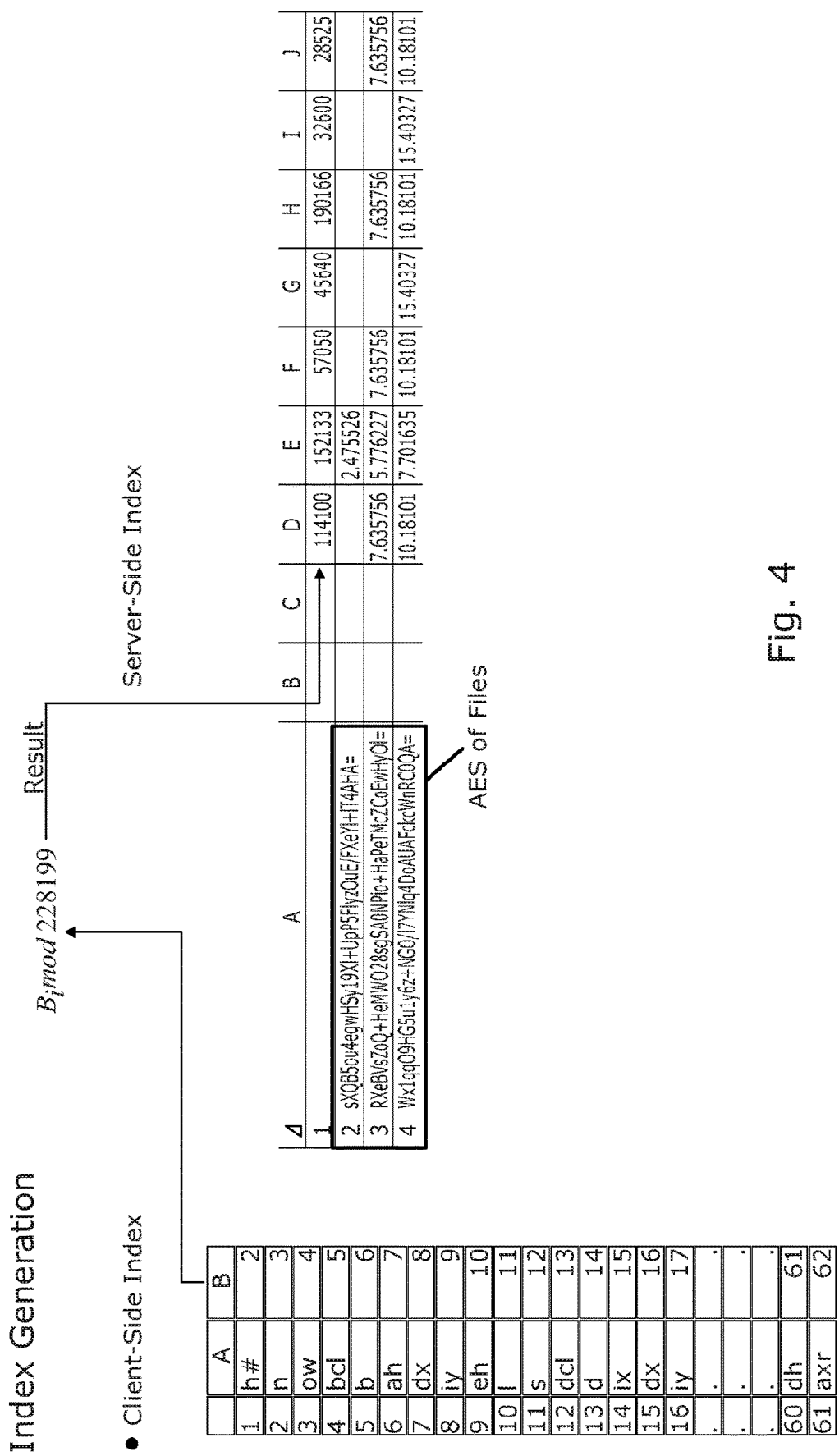
FIG. 4 is a schematic drawing showing server-side index table generation in accordance with the method and system of FIG. 1.

Referring in particular to FIGS. 1 and 4, with regard to the searchable encrypter (106), the phoneme identifier (118) identifies one or more sets of phonemes (150) from the string of phonetic symbols (144). An integer is assigned to each phoneme forming a key called the client-side index generator (122). This is later used to generate trapdoor queries.

Referring also to FIG. 4, the relevance score generator (120) generates a frequency table based on the occurrence of phonemes in each phonetic transcription (144). The relevance score is a key component for the server-side index table. The index table has phonemes in the first column, transcription files index ion the first row, and the relevance scores in the cells. In addition to the transcription file names are encrypted, preferably using AES encryption, and the phoneme indices are modulo prime encrypted. The server side index table is then uploaded to the cloud and destroyed on the client side.

Figure 5:
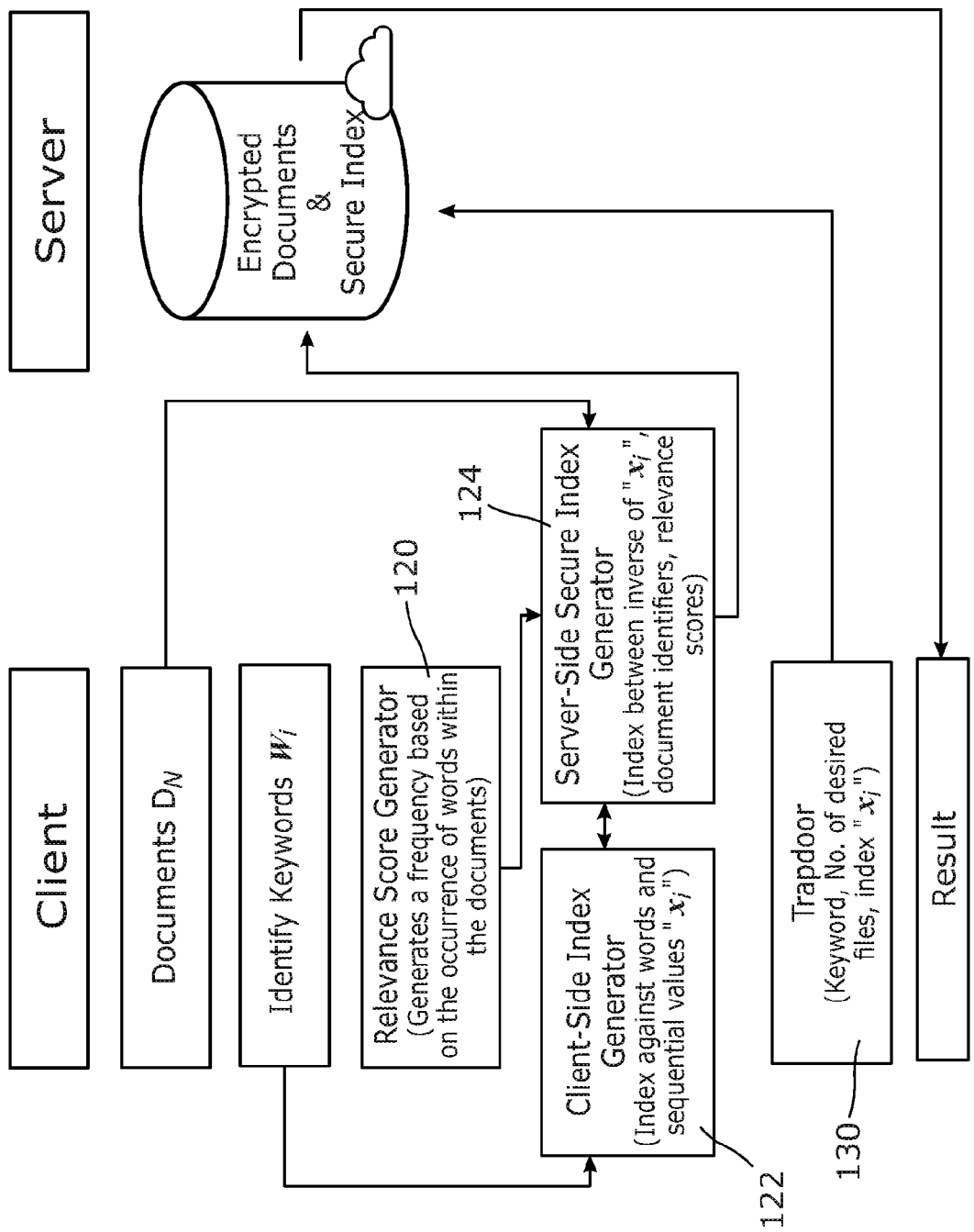
FIG. 5 is a schematic drawing showing the flow of events undertaken by the encrypted phonetic search engine of the method and system of FIG. 1.

Referring also to FIG. 5, the client-server infrastructure is best described using a scenario in which there are two parties, a client (CLIENT) and a cloud server (CLOUD). The client intends to upload all her documents (encrypted speech files) $D=\{D_1, D_2, \ldots, D_i\}$ to the cloud server to enable remote access. The cloud server performs the searching of the relevant documents on behalf of the client. In the scheme it is assumed that the cloud server acts in a known and designated manner but is equally also willing and curious to get hold of any information about the documents held with it. To prevent theft of any of the information the client decides to encrypt all the documents. Once the documents are encrypted and outsourced she is challenged with the problem of searching on the encrypted documents. Whenever the client decides to view a particular file she has to download all the documents from the cloud server and after decrypting all of them she can get hold of her required set of files. This creates unnecessary network traffic and post processing overhead. The client decides to outsource the documents in such a way that she would only have to download the relevant and desired documents while keeping the security and privacy of the outsourced files intact. This requires the method and system according to the present invention, which facilitates performing textual searches over encrypted data.

Referring particularly to FIG. 1, to search for a keyword in the cloud encrypted audio, a user (i.e. client) inputs one or more keywords (152) into the encrypted phonetic search engine (108). The lexicon (126) is consulted (154) which relates the text (graphemes) to phonemes. The phonetic convertor (128) then converts the text search term (i.e. keyword) into an equivalent phonetic string (156) and/or a matrix of phonemes. However, in an alternative embodiment a user can input the string of phonemes (as search term) and thereby eliminate the steps of converting the text of the keywords into phonemes.

A trapdoor is then generated for the string of phonemes (158) by the trapdoor generator (130). The trapdoor is then passed to the cloud (160) for searching the server-side index table for the most relevant phonetic transcription and corresponding audio file. The most relevant file name and encrypted text file (.dat file) is returned after the search (162). The user can then decrypt it and the phonetic transcription and play the returned audio at the relevant time interval.

In more detail, the encrypted phonetic search engine (108) searches over encrypted documents in three phases (Setup, Searching and Outcome).

The first phase, i.e. the Setup Phase, comprises the three steps Keyword Identification, Client Index Generation and Server Index Generation. In the first step the client generates an exhaustive set of unique Keywords $W=\{W_1, W_2, \ldots, W_N\}$ from the set of documents D to be outsourced. Next, a client-side index table $I_c$ is built. The $I_c$ is stored with the client and is never revealed to the cloud server. In the final step, the client generates a secure ranked server-side index Is and outsources it to the cloud server along with the encrypted set of documents D. This involves the relevant frequencies of the keywords to be calculated and inserted into the index table.

In the Searching Phase, the client generates the Trapdoor $T_i$ (158) for the particular keyword $W_i$ it wishes to search. $T_i$ is then transmitted to the cloud server (160) to facilitate the search. In the Outcome Phase the cloud server returns the encrypted set of desired files to the client in the ranked order. FIG. 5 shows the flow of events of the ranked searchable encryption scheme where a client is interacting with a cloud server. It can be seen that all the tasks are performed by the client, whereas, the searching is done at the cloud server side.

Pre-processing is done on the client side in three major steps, namely frequency computation, client-side index generation and server-side index generation. With frequency computation, the scheme computes the frequency of words appearing in each of the selected files. The next task is to generate the client-side index. The client side index table is a collection of all key words each assigned with a unique integer other than 0 and 1. If the total number of a set of keywords is, say, 'N' in number, then a prime number 'p' is chosen such that p>N. All integers that are assigned for the keywords are from the set $\{2, 3, \ldots, p-1\}$.

The client-side index table is a key for the keywords, which are phonetic symbols. The server-side index table keeps track of the distribution of the keywords throughout the documents. The server-side index table is a frequency table with three modifications:

Firstly, the words are replaced by the integers which are the multiplicative inverse of their corresponding client-side index computed modulo prime p. For example, the client-side index of this is 2. The multiplicative inverse of 2 in modulo 228199 is 114100. So in the Server-side index table, the word 'this' is replaced by 114100. Secondly, the file names in the frequency table are replaced by the encrypted file names. For example, word.doc is replaced by AES (word.doc) as shown in FIG. 4. Lastly, the frequencies are replaced by relevant scores which are computed using the following formula:

$$\text{Score}(Q, F_d) = \sum_{t \in Q} \frac{1}{|F_d|}(1 + \ln f_{d,x})\ln\left(1 + \frac{N}{f_t}\right)$$

Referring to again to FIG. 4, to search for a keyword, say the phoneme 'n', the client will compute E=(Decimal (AES ('n'))) mod 228199 and the trapdoor K=(Decimal (AES ('n'))*3) mod 228199. Note that 3 is the client-side index of the phonetic symbol 'n'. On the server side, after receiving (K, E), K will be multiplied modulo 228199 with the integers occurring in the first row of server-side index table one by one unless product matches K. For example since the multiplicative inverse of 3 in modulo 228199 is 152133, (K×152133) mod 228199=Decimal (AES ('n')) mod 228199=E. Now the entries of the column corresponding to the integer 152133 are to be checked. The higher the score, the more relevant the corresponding file is with respect to the search. If the number of files in which the search is be performed is, say, 2, then the top two files according to the top two relevant scores for the keyword 'n' are 7.7 and 5.7 and the corresponding encrypted files are new.docx and Latest.doc. So the server will return the encrypted new.docx first and then Latest.doc.

The encrypted phonetic search engine (108) can also search for strings of phonetic symbols. A lexicon (154) resides on the client-side (CLIENT), enabling the user to search using words. The lexicon (154) transforms the search into strings of phones and then the encrypted search can be performed. S light modification to the server-side index table is required wherein the relevance score is replaced with a string of integers indicative of a hash chain. To implement the hash chain functionality, the server side index table has the various phonetic symbols coded into the column entries of the table. Take a randomly generated lambda-bit integer, say r, then the first column in the server side index table will be r, the next column will be H(r), the third column will be $H^2(r)$ and in general the column corresponding to the i-th symbol will be $H^{i-1}(r)$, where H( ) is a cryptographically strong keyed hash function (SHA-1 or SHA-2).

Therefore, to search for the encrypted audio on the cloud containing a particular word, say the word "test", the lexicon is consulted which returns that the encoded speech repository should be searched for the phonetic string "t eh s t". Then, all entries corresponding to the symbol "t" are masked with $H_{k_m}$ (t). similarly, entries corresponding to other keywords are masked. Hence to search for the string "t eh s t" for each symbol s, the client will compute:

$$k_i = H(\text{decimal}(AES(s_i)) + c = H_{k_m}(s_i))$$

$$K_i^{td} = \text{decimal}(AES(s_i)) * c \bmod p$$

$$msk_i = \text{decimal}(AES(s_i))^{-1} * H_{k_m}(s_i)$$

where c is the client side index for the phonetic symbol under question. The search query is then of the form:
({$k_1$, $k_1^{td}$, $msk_1$}), ({$k_2$, $k_2^{td}$, $msk_2$}), ({$k_3$, $k_3^{td}$, $msk_3$}), ({$k_4$, $k_4^{td}$, $msk_4$}).

Using the Ranked Searchable Encryption, RSE, described above, the server detects the columns corresponding to "t", "eh", "5", "t" and return the encrypted audio filename.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:
1. A method comprising:
receiving an audio recording;
converting the received audio recording to provide a text or binary file format representation of the audio recording, wherein the received audio recording or the converted text or binary file format representation is associated with a file name;
encrypting the converted text or binary file format representation of the audio recording to provide an encrypted text or binary file format representation of the received audio recording;
storing the encrypted text or binary file format representation on the cloud;
phonetically encoding the received audio recording to provide an encoded phonetic transcription representing the received audio recording;
encrypting the encoded phonetic transcription to provide an encrypted phonetic transcription representing the received audio recording;
storing the encrypted phonetic transcription representation on the cloud;
identifying one or more phonemes from the encoded phonetic transcription;
assigning an integer to each of the one or more phonemes and generating a client-side index on a client side from the assigned integers, wherein the client-side index comprises index integer values;
generating a frequency table entry, associated with the file name, based on an occurrence frequency of each of the one or more phonemes in the encoded phonetic transcription;
generating a server-side secure index entry of a server-side secure index and uploading the server-side secure index entry to the cloud before destroying the server-side secure index entry on the client side, whereby generating the server-side secure index entry comprises replacing each of the one or more phonemes of the client-side index with a corresponding integer that is a multiplicative inverse of its corresponding index integer value computed modulo prime p, replacing the file name associated with the frequency table entry with an encrypted file name, and replacing each of the occurrence frequencies of the frequency table entry with relevant scores which are computed using a formula:

$$\text{Score}(Q, F_d) = \sum_{t \in Q} \frac{1}{|F_d|}(1 + \ln f_{d,t})\ln\left(1 + \frac{N}{f_t}\right);$$

receiving a keyword enquiry represented as a phonetic string;
converting the phonetic string to a sequence of integers using the client-side index;
generating a trapdoor function for the phonetic string and uploading the trapdoor function to the cloud;
searching the server-side secure index, using the uploaded trapdoor function, for a most relevant server-side secure index entry;
responsive to the searching, returning a most relevant encrypted text or binary file format representation and its corresponding encrypted phonetic transcription representation as associated with the most relevant server-side index entry; and
decrypting the returned, most relevant encrypted text or binary file format representation and the corresponding encrypted phonetic transcription for generation of an audio file for playing at a relevant time interval.

2. A method as claimed in claim 1, whereby the keyword enquiry is received as one or more words whereby each word is converted into the phonetic string.

3. A method as claimed in claim 1, whereby one or more of the encryptings utilize an Advanced Encryption Standard, AES, encryption technique.

4. A method as claimed in claim 1, whereby the step of phonetically encoding the received audio recording comprises converting the audio recording into a Short-Term Fourier Transform, STFT, and finding a magnitude of a STFT complex array to generate a spectrogram.

5. A method as claimed in claim 4, whereby the spectrogram is passed to a trained Convolutional Neural Network, CNN, which classifies sliding windows operating over the spectrogram into phonetic symbols.

6. A method as claimed in claim 5, whereby each sliding window operating over the spectrogram is 256×256 greyscale pixels.

7. A computer-readable storage device having instructions stored which, when executed by a computing system, result in the computing system performing operations in accordance with a method comprising:
  receiving an audio recording;
  converting the received audio recording to provide a text or binary file format representation of the audio recording, wherein the received audio recording or the converted text or binary file format representation is associated with a file name;
  encrypting the converted text or binary file format representation of the audio recording to provide an encrypted text or binary file format representation of the received audio recording;
  storing the encrypted text or binary file format representation on the cloud;
  phonetically encoding the received audio recording to provide an encoded phonetic transcription representing the received audio recording;
  encrypting the encoded phonetic transcription to provide an encrypted phonetic transcription representing the received audio recording;
  storing the encrypted phonetic transcription representation on the cloud;
  identifying one or more phonemes from the encoded phonetic transcription;
  assigning an integer to each of the one or more phonemes and generating a client-side index on a client side from the assigned integers, wherein the client-side index comprises index integer values;
  generating a frequency table entry, associated with the file name, based on an occurrence frequency of each of the one or more phonemes in the encoded phonetic transcription;
  generating a server-side secure index entry of a server-side secure index and uploading the server-side secure index entry to the cloud before destroying the server-side secure index entry on the client side, whereby generating the server-side secure index entry comprises replacing each of the one or more phonemes of the client-side index with a corresponding integer that is a multiplicative inverse of its corresponding index integer value computed modulo prime p, replacing the file name associated with the frequency table entry with an encrypted file name, and replacing each of the occurrence frequencies of the frequency table entry with relevant scores which are computed using a formula:

$$\text{Score}(Q, F_d) = \sum_{t \in Q} \frac{1}{|F_d|}(1 + \ln f_{d,x}) \ln\left(1 + \frac{N}{f_t}\right);$$

receiving a keyword enquiry represented as a phonetic string;
  converting the phonetic string to a sequence of integers using the client-side index;
  generating a trapdoor function for the phonetic string and uploading the trapdoor function to the cloud;
  searching the server-side secure index, using the uploaded trapdoor function, for a most relevant server-side secure index entry;
  responsive to the searching, returning a most relevant encrypted text or binary file format representation and its corresponding encrypted phonetic transcription representation as associated with the most relevant server-side index entry; and
  decrypting the returned, most relevant encrypted text or binary file format representation and the corresponding encrypted phonetic transcription for generation of an audio file for playing at a relevant time interval.

8. A computer-readable storage device as claimed in claim 7, whereby the keyword enquiry is received as one or more words whereby each word is converted into the phonetic string.

9. A computer-readable storage device as claimed in claim 7, whereby one or more of the encryptings utilize an Advanced Encryption Standard, AES, encryption technique.

10. A computer-readable storage device as claimed in claim 7, whereby the step of phonetically encoding the received audio recording comprises converting the audio recording into a Short-Term Fourier Transform, STFT, and finding a magnitude of a STFT complex array to generate a spectrogram.

11. A computer-readable storage device as claimed in claim 10, whereby the spectrogram is passed to a trained Convolutional Neural Network, CNN, which classifies sliding windows operating over the spectrogram into phonetic symbols.

12. A computer-readable storage device as claimed in claim 11, whereby each sliding window operating over the spectrogram is 256×256 greyscale pixels.

13. A computing system comprising:
  one or more processors; and
  one or more computer-readable storage devices having instructions stored which, when executed by at least one of the one or more processors, result in performance of operations in accordance with a method comprising:
    receiving an audio recording;
    converting the received audio recording to provide a text or binary file format representation of the audio recording, wherein the received audio recording or the converted text or binary file format representation is associated with a file name;
    encrypting the converted text or binary file format representation of the audio recording to provide an encrypted text or binary file format representation of the received audio recording;
    storing the encrypted text or binary file format representation on the cloud;
    phonetically encoding the received audio recording to provide an encoded phonetic transcription representing the received audio recording;
    encrypting the encoded phonetic transcription to provide an encrypted phonetic transcription representing the received audio recording;
    storing the encrypted phonetic transcription representation on the cloud;
    identifying one or more phonemes from the encoded phonetic transcription;
    assigning an integer to each of the one or more phonemes and generating a client-side index on a client side from the assigned integers, wherein the client-side index comprises index integer values;

generating a frequency table entry, associated with the file name, based on an occurrence frequency of each of the one or more phonemes in the encoded phonetic transcription;

generating a server-side secure index entry of a server-side secure index and uploading the server-side secure index entry to the cloud before destroying the server-side secure index entry on the client side, whereby generating the server-side secure index entry comprises replacing each of the one or more phonemes of the client-side index with a corresponding integer that is a multiplicative inverse of its corresponding index integer value computed modulo prime p, replacing the file name associated with the frequency table entry with an encrypted file name, and replacing each of the occurrence frequencies of the frequency table entry with relevant scores which are computed using a formula:

$$\text{Score}(Q, F_d) = \sum_{t \in Q} \frac{1}{|F_d|}(1 + \ln f_{d,x})\ln\left(1 + \frac{N}{f_t}\right);$$

receiving a keyword enquiry represented as a phonetic string;

converting the phonetic string to a sequence of integers using the client-side index;

generating a trapdoor function for the phonetic string and uploading the trapdoor function to the cloud;

searching the server-side secure index, using the uploaded trapdoor function, for a most relevant server-side secure index entry;

responsive to the searching, returning a most relevant encrypted text or binary file format representation and its corresponding encrypted phonetic transcription representation as associated with the most relevant server-side index entry; and decrypting the returned, most relevant encrypted text or binary file format representation and the corresponding encrypted phonetic transcription for generation of an audio file for playing at a relevant time interval.

14. A computing system as claimed in claim 13, whereby the keyword enquiry is received as one or more words whereby each word is converted into the phonetic string.

15. A computing system as claimed in claim 13, whereby one or more of the encryptings utilize an Advanced Encryption Standard, AES, encryption technique.

16. A computing system as claimed in claim 13, whereby the step of phonetically encoding the received audio recording comprises converting the audio recording into a Short-Term Fourier Transform, STFT, and finding a magnitude of a STFT complex array to generate a spectrogram.

17. A computing system as claimed in claim 16, whereby the spectrogram is passed to a trained Convolutional Neural Network, CNN, which classifies sliding windows operating over the spectrogram into phonetic symbols.

18. A computing system as claimed in claim 17, whereby each sliding window operating over the spectrogram is 256×256 greyscale pixels.

* * * * *